United States Patent
Matsuzaki et al.

(10) Patent No.: US 6,283,763 B1
(45) Date of Patent: Sep. 4, 2001

(54) MEDICAL OPERATION SIMULATION SYSTEM CAPABLE OF PRESENTING APPROACH DATA

(75) Inventors: Hiroshi Matsuzaki, Hachioji; Takao Shibasaki, Tokyo; Akito Saito, Hino; Takeo Asano, Kunitachi, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/192,902

(22) Filed: Nov. 16, 1998

(30) Foreign Application Priority Data

Dec. 1, 1997 (JP) ................................... 9-330390

(51) Int. Cl.[7] .................................... G09B 23/28

(52) U.S. Cl. ..................... 434/262; 434/267; 434/272

(58) Field of Search ......................... 434/262, 263, 434/264, 265, 266, 267, 268, 269, 270, 271, 272, 273, 274, 275

(56) References Cited

U.S. PATENT DOCUMENTS

| | | | | |
|---|---|---|---|---|
| 5,882,206 | * | 3/1999 | Gillio | 434/262 |
| 5,971,767 | * | 10/1999 | Kaufman et al. | 434/267 |
| 6,083,163 | * | 7/2000 | Wegner et al. | 600/429 |

FOREIGN PATENT DOCUMENTS 8-10266   1/1996   (JP).

* cited by examiner

Primary Examiner—John Edmund Rovnak
(74) Attorney, Agent, or Firm—Frishauf, Holtz, Goodman, Langer & Chick, P.C.

(57) ABSTRACT

A medical operation simulator includes a three-dimensional image reconstruction section, an instrument-image forming section, and an approach data presenting section. The three-dimensional image reconstructing section processes data representing slice images, thereby generating three-dimensional image data. The three-dimensional image data is supplied to a display device. The instrument-image forming section forms an image of a medical instrument. The image moves in the same way that a medical instrument provided on an operation input device is manipulated by an operator. The instrument-image forming section supplies data representing the image of the instrument to the display device. The display device displays the image of the instrument together with a three-dimensional image represented by the three-dimensional image data generated by the three-dimensional image reconstructing means. The approach data presenting section converts data showing an approach of the medical instrument toward a region of interest into at least one of an aural sensation, visual sensation, pressure sensation and touch sensation, by performing approach data presentation processing, and then presents at least one of the aural sensation, visual sensation, pressure sensation and touch sensation.

16 Claims, 5 Drawing Sheets

MEDICAL OPERATION SIMULATION SYSTEM CAPABLE OF PRESENTING APPROACH DATA

BACKGROUND OF THE INVENTION

The present invention relates to a medical operation simulation system. More particularly, the invention relates to a medical operation simulator and a method of controlling the simulator. The simulator enables an operator to simulate a medical operation by manipulating an imitation instrument provided on an operation input device, thereby moving a virtual instrument in a virtual space, with respect to a three-dimensional image constructed from slice images formed by means of X-ray CT, MRI, MRA or the like, and which displays the positional relation between a region of interest and each virtual instrument moving as the operator operates the operation input device.

A medical operation may be simulated and navigated by using slice images such as X-ray CT images, MRI images or MRA images. The simulation and navigation thus performed are important since they help operators to plan procedures for operations to be performed or to support operators to perform operations.

In the present specification, operative navigation performed during actual operations will be called "simulation," too.

Simulation and navigation are effected by using slice images which have been formed at regular intervals. Important regions and anti-invasive regions, such as the affected parts, the blood vessels and the nerve, are extracted from the slice images and visualized. The simulation assists the operator, enabling him or she to move the virtual instruments without touching the virtual anti-invasive regions.

A method of performing operative navigation is known, as disclosed in Jpn. Pat. Appln. No. 8-10266. In the method, the positions of the instruments being used in an operation are detected, slice images that correspond to the instruments are selected, and patterns indicating the positions of the instruments are displayed and superimposed on the slice images. And an alarm is generated when any instrument approaches a critical region.

To accomplish more realistic simulation it is effective to display three-dimensional images. The three-dimensional images displayed reduce the visual discrepancy between the real regions and instruments, on the one hand, and the virtual regions and instruments, on the other. Thus, more correct simulation can be carried out.

In the conventional method described above, medical instruments only are displayed and superimposed on the slice images. No three-dimensional images are displayed. This makes it difficult for operators to grasp the three-dimensional relationship between the position of each instrument and the position of any region.

In the conventional method, an alarm is generated when any instrument comes within a predetermined distance from an anti-invasive region. However, it is impossible to determine minute changes in the distance between the instrument and the region.

BRIEF SUMMARY OF THE INVENTION

The present invention has been made in view of the foregoing. The object of the invention is to provide a medical operation simulation system which includes a medical operation simulator and a method of controlling the simulator. The simulator reconstructs three-dimensional images from slice images, displays the three-dimensional images, enables an operator to operate a operation input device to move virtual instruments on a display and presents data showing how much any instrument has approached a region of interest, thereby accomplishing high-reality simulation. Comprising the simulator and the method of controlling the simulator, the medical operation simulation system can present the approach data to the operator.

To attain the object, a medical operation simulator according to an aspect of the invention comprises: a three-dimensional image reconstructing device for processing data representing slice images, thereby to generate three-dimensional image data, and supplying the three-dimensional image data to a display device; an instrument-image forming device for forming an image of a medical instrument, the image moving in the same way that a medical instrument provided on an operation input device is manipulated by an operator, and for supplying data representing the image of the medical instrument to the display device, thereby to display the image of the medical instrument together with a three-dimensional image represented by the three-dimensional image data generated by the three-dimensional image reconstructing device and an approach data presenting device for converting data showing an approach of the medical instrument toward a region of interest into at least one of an aural sensation, visual sensation, pressure sensation and touch sensation by performing approach data presentation processing, and for presenting at least one of the aural sensation, visual sensation, pressure sensation and touch sensation.

To achieve the object, a method of controlling a medical operation simulator, according to another aspect of the invention, comprises: processing data representing slice images, thereby to generate three-dimensional image data, and then supplying the three-dimensional image data to a display device; forming an image of a medical instrument, the image moving in the same way that a medical instrument provided on an operation input device is manipulated by an operator, and then supplying data representing the image of the medical instrument to the display device, thereby to display the image of the medical instrument together with a three-dimensional image represented by the three-dimensional image data generated; and converting data showing an approach of the medical instrument toward a region of interest into at least one of an aural sensation, visual sensation, pressure sensation and touch sensation by performing an approach data presentation processing, and presenting at least one of the aural sensation, visual sensation, pressure sensation and touch sensation.

The present invention makes it possible to perform an accurate simulation, because the operator can know how much the image of the instrument has approached, or how far it is positioned from, an affected part or a critical region, while observing the three-dimensional image displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

Figure 1:
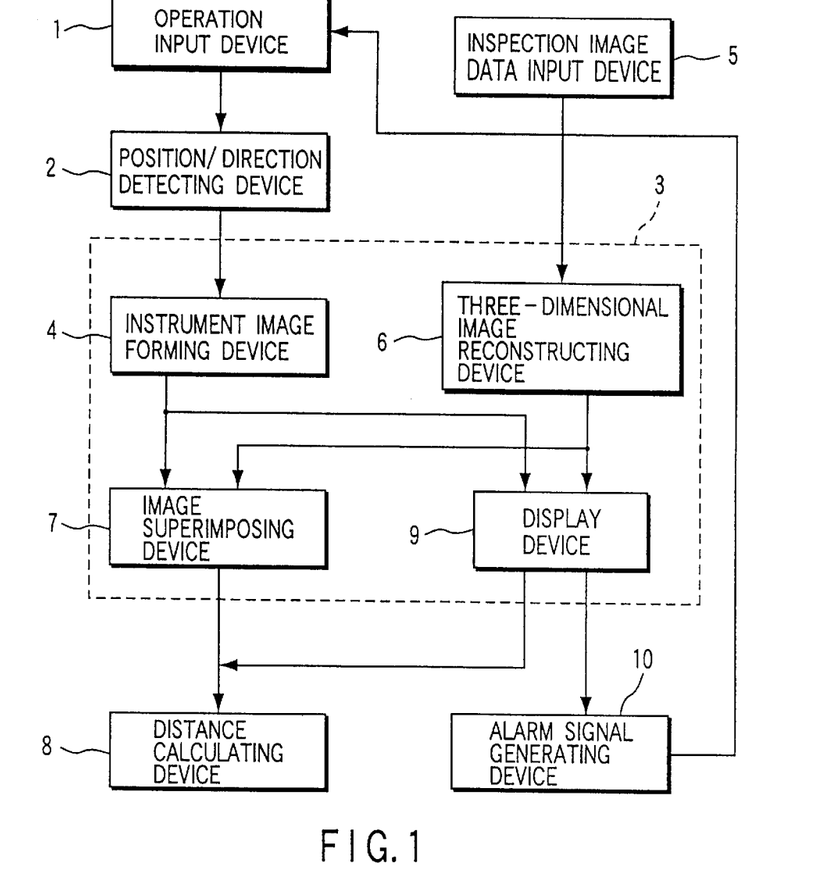
FIG. 1 is a block diagram showing a medical operation simulator according to an embodiment of the invention.

FIG. 1 is a block diagram showing a medical operation simulator according to an embodiment of the invention.

As shown in FIG. 1, the simulator comprises an operation input device 1, a position/direction detecting device 2, an arithmetic apparatus 3, an inspection image data input device 5, a display device 8, and an alarm signal generating device 10. Imitation instruments are provided on the operation input device 1. Each imitation instrument can be manipulated freely. When an operator manipulates any imitation instrument, the position/direction detecting device 2 detects the position and orientation of the imitation instrument and generates data representing the position and orientation detected. The data is supplied to the arithmetic apparatus 3.

The arithmetic apparatus 3 comprises an instrument image forming device 4, a three-dimensional image reconstructing device 6, an image superimposing device 7, and a distance calculating device 9.

The instrument-image forming device 4 processes the data supplied from the position/direction detecting device 2, thereby generating data showing an image of the imitation instrument. The display device 8 displays the image of the instrument, which moves on the screen of the display device in the same way as the operator manipulates the imitation instrument.

Figure 2:
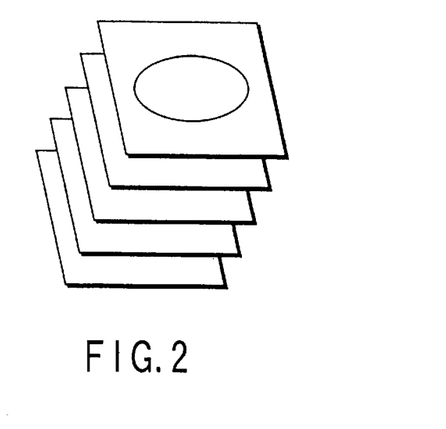
FIG. 2 is a schematic representation of slice images formed at regular intervals which have been input via the image input device 5 to the three-dimensional dimentional image reconstructing device 6 of the arithmetic apparatus 3 and which are to be processed to in order to reconstruct a three-dimensional image in the medical operation simulator shown in FIG. 1.

Data representing slice images of the type shown in FIG. 2, which have been formed at regular intervals, is input to the arithmetic apparatus 3 from the inspection image data input device 5. In the arithmetic apparatus 3, the three-dimensional image reconstructing device 6 process the data, generating data showing an three-dimensional image to be inspected or examined. The data generated by the device 6 is supplied to the image superimposing device 7.

The image superimposing device 7 synthesizes the three-dimensional image data with the instrument-image data supplied from the instrument-image forming device 4, thereby generating synthesized image data. The synthesized image data is supplied to the display device 8. The display device 8 displays a synthesized image represented by the input data (i.e., a three-dimensional image to be inspected) and an image of the imitation instrument, on the same screen.

In the three-dimensional image reconstructing device 6, the data items showing the slice image are filtered to achieve image smoothing and is subjected to threshold process, extraction of characterizing regions and segmentation. The device 6 combines the data items thus processed, generating data representing a three-dimensional image. The data is eventually supplied to the display device 8, which displays the three-dimensional image represented by this data.

The display device 8 can display images by means of either surface rendering or volume rendering, in accordance with the instruction input by the operator. Surface rendering, which is one of the methods for reconstructing three-dimensional images, is performed in the three-dimensional image reconstructing device 6. More specifically, the surface rendering is accomplished by generating equal-value surfaces at the boundaries between the regions of any image that has been subjected to segmentation. In the segmentation the regions are made to differ in transmittance, so that the rendering may be achieved to enable the operator to see inner regions.

If volume rendering is performed, it will become possible to display segmentation regions in different colors.

In the process of reconstructing a three-dimensional image, some regions of interest, such as affected parts and anti-invasion regions (e.g., the blood vessels and the nerve), are set from the slice images. These regions are subjected to segmentation. They are set, either automatically or manually. In the case of the manual setting, the operator can perform threshold process on the slice images and set whichever region desired.

Further, it is possible to combine a plurality of images, such as CT images, MRI images, MRA images and SPEC images, in the same three-dimensional space. The resultant combined image may be displayed on the screen of the display device 8.

The display device 8 may be a three-dimensional image display which can display not only two-dimensional images (e.g., CRT images and LCD images), but also stereoscopic images. In this case, the distance calculating device 9 keeps calculating the distance between the tip of the image of the imitation instrument and the region of interest. The data representing the distance calculated is supplied to the display device 8 and the alarm signal generating device 10. The display device 8 displays the distance. The alarm signal generating device 10 generates an alarm signal on the basis of the distance. More precisely, the device 10 generates an alarm signal when the distance between the image of the imitation instrument and the region of interest becomes shorter than a predetermined value.

Since any region of interest has a volume, its center may either be the center of gravity or the point in the region that the operator has designated. The distance the calculating device 9 calculates may therefore be defined as one between the tip of the image of the imitation instrument and the gravity center of the region, or as one between the tip of the image of the imitation instrument and the designated point in the region. Alternatively, the distance may be defined as the shortest one between the surface of the region and the image of the imitation instrument.

The alarm signal is supplied to the display device 8. In accordance with the alarm signal, the display device 8 changes the color of the region of interest displayed on the screen. More precisely, the device 8 changes the hue or density of the color, or flashes the entire screen. Alternatively, the alarm signal may be supplied to a speech generating device (not shown), which generate an oral alarm.

Furthermore, the alarm signal generated by the alarm signal generating device 10 may be fed back to the operation input device 1, and a mechanism incorporated in the device 1 may apply a force, a pressure or a touch to the operator.

Figure 3:
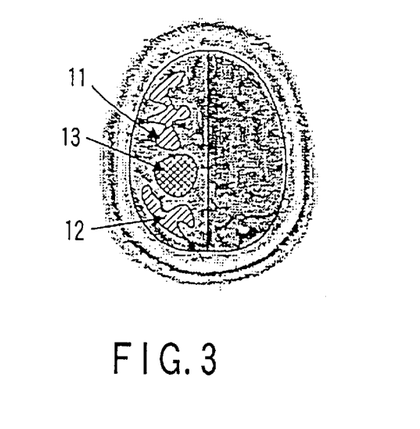
FIG. 3 is a diagram for explaining how a slice image of a region of interest in the field of neurosurgery should be displayed in order to make it easy to understand which part of the image should be the target, while segmentation is being performed on the slice image in the medical operation simulator shown in FIG. 1.

In the simulation of neurosurgery, in particular, segmentation may be performed on some regions of interest in a slice image as shown in FIG. 3. If so, the critical regions 11 and 12 that should not be invaded are displayed in one fashion, while the affected region 13 is displayed in another fashion. For example, the affected region 13, or target, may be displayed in a specific color, while the critical regions 11 and 12 are displayed a different color. The target can therefore be well distinguished from the other regions. This enables the operator to recognize easily the position of the target, i.e., critical target 13.

In the case where a plurality of regions of interest are set, different threshold distances are designated for these regions, respectively, in accordance with the importance of each region. The alarm signal generating device 10 generates an alarm signal when an imitation instrument approaches any region of interest within the threshold distance designated for that region.

Figure 4:
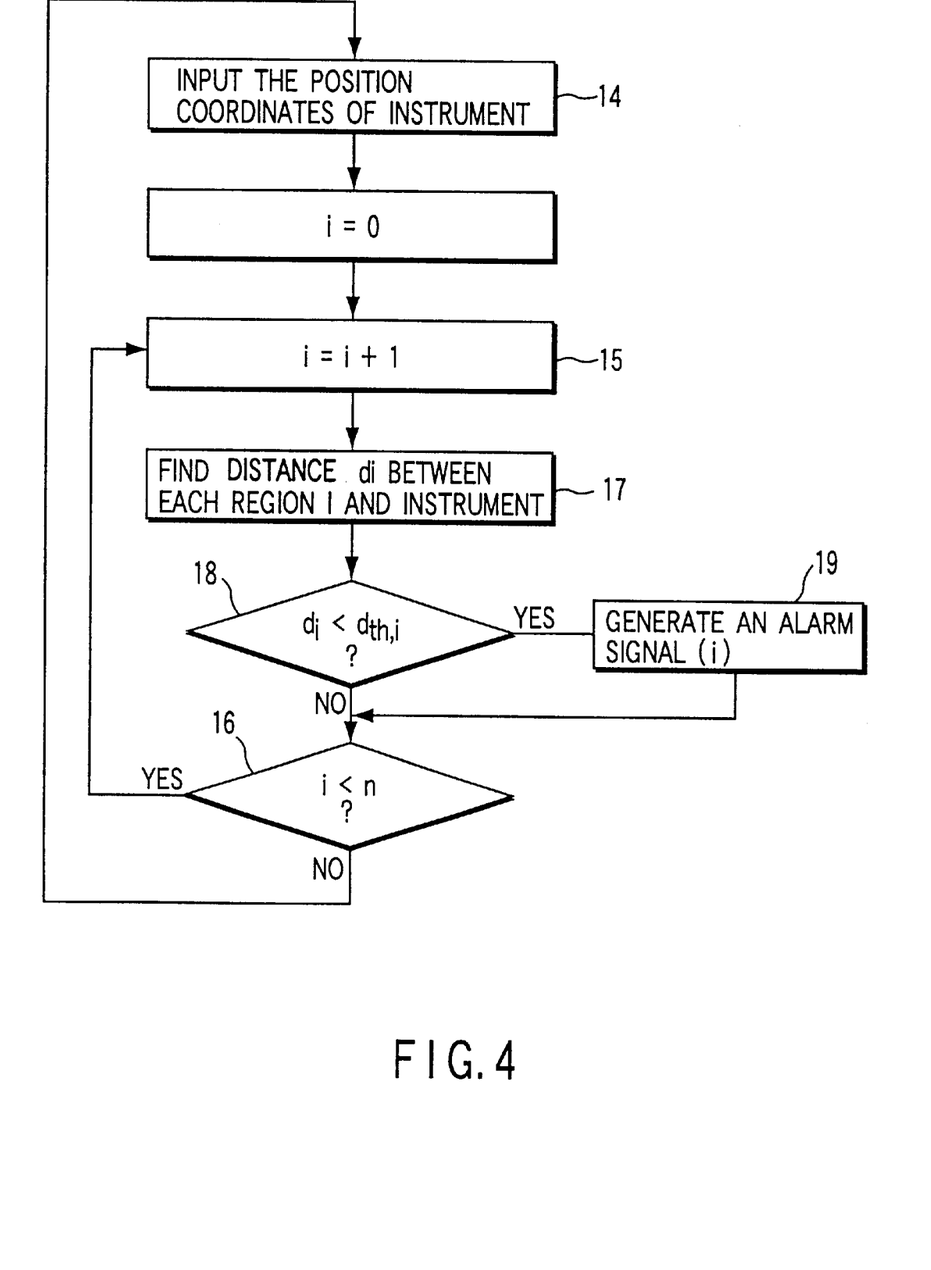
FIG. 4 is a flow chart explaining how alarm signals are generated in the case where a plurality of regions of interest are set and different threshold distances are designated for the regions, each designated in accordance with the importance of the region, in the medical operation simulator shown in FIG. 1.

FIG. 4 is a flow chart explaining how the device 10 generates an alarm signal. As shown in FIG. 4, the position coordinates of an imitation instrument are input at regular intervals in Step 14. In the loop consisting of Steps 15, 17, 18 and 16, the distances between the imitation instrument and all regions of interest are calculated in Step 17. In Step 18, the distances calculated are compared with the threshold distances designated for the regions, respectively. If any distance calculated is shorter than the corresponding threshold distance, an alarm signal is generated for the region of interest, in Step 19.

The sequence of Steps 14, 15, 17, 18, 19 and 16 is repeated at regular intervals in the medical operation simulator according to the present invention.

Figure 5:
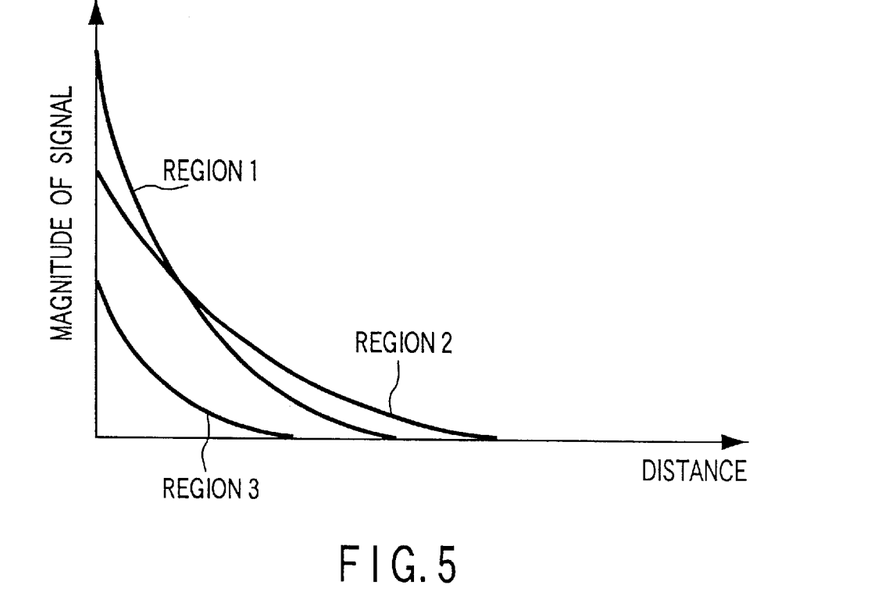
FIG. 5 is a graph for how an alarm signal is changed in magnitude as an instrument approaches a region of interest, in the medical operation simulator shown in FIG. 1, in order to inform the operator that the instrument is very near the region and still approaching the region.

The alarm signal may be gradually increased in magnitude as shown in FIG. 5, thereby to inform the operator that the imitation instrument is approaching a region of interest. To be more specific, the distance-magnitude curves for regions 1, 2 and 3 are set as different functions, as illustrated in FIG. 5. Alternatively, different types of approach data signals may be set, each for one region of interest.

A function can be set for each region of interest on the basis of both the importance of the region and the size thereof. For example, as shown in FIG. 5, a function represented by a steep curve is set for the region 1, which is small but important. As shown in FIG. 5, too, a function represented by a gently slope is set for the region 2, which is large but not so important.

An alarm signal may be generated, which has a great magnitude and whose magnitude greatly changes as the operator moves the imitation instrument.

This alarm signal indicates that the region of interest to which the instrument is approaching is a highly critical one. In this case, the operator needs to take much care while manipulating the imitation instrument.

Figure 6:
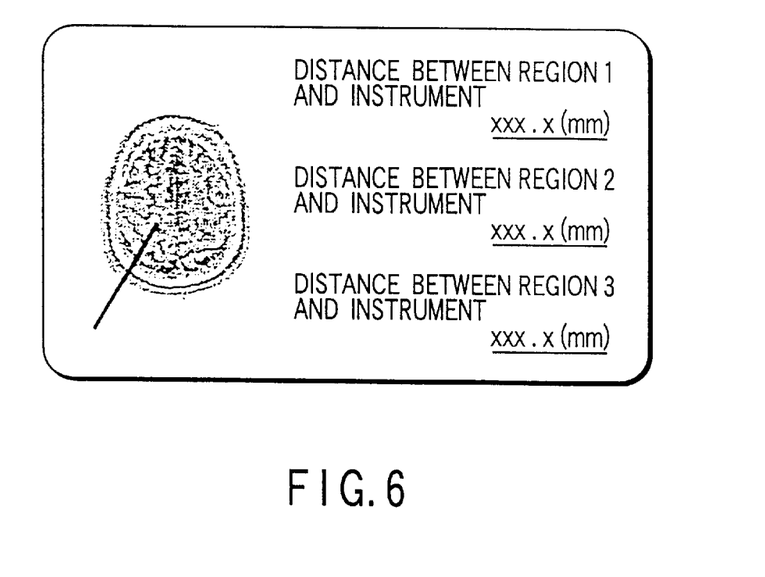
FIG. 6 shows the screen of the display device 8 of the simulator shown in FIG. 1, which displays the distances between the instrument, on the one hand, and some regions of interest, on the other, so that the operator may visually recognize not only the alarm signal but also the distance between the instrument and each region of interest.

The distances between the instrument, on the one hand, and the regions of interest, on the other, are always displayed on the screen of the display device 8, as is illustrated in FIG. 6. The operator can therefore visually recognize not only the alarm signal but also the distance between the instrument and each region of interest.

Figure 7A:
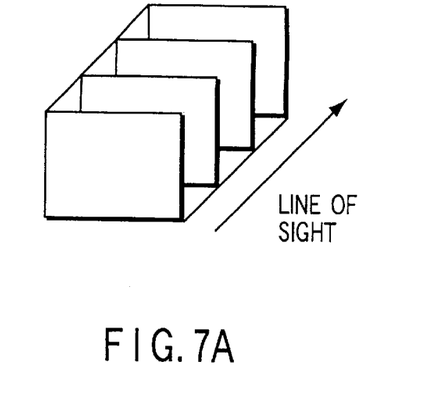
FIGS. 7A and 7B show slice images formed at appropriate intervals and displayed in the direction of incision, in the medical operation simulator shown in FIG. 1.
Figure 7B:
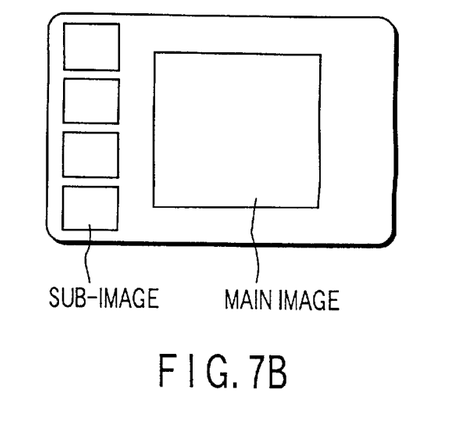

In the present invention, the display device 8 can display not only a three-dimensional image by means of surface rendering or volume rendering. But also can it display slice images formed at appropriate intervals, arranged in the direction of incision, as is illustrated in FIG. 7A. Slice images can be so displayed, thanks to the operation of the three-dimensional image reconstructing device 6. In the case shown in FIG. 7B, the device 8 displays a series of slice images as sub-images and a three-dimensional image as main image, on the same screen. The main image and the sub-images, displayed on the same screen, help the operator to decide which part of the region should be incised and in which direction it should be incised.

Figure 8:
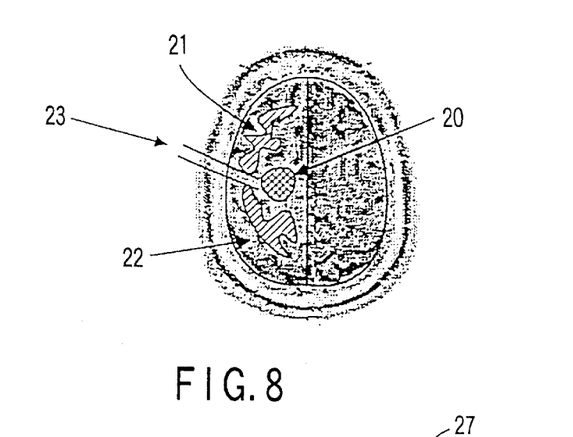
FIG. 8 is a diagram for explaining how an instrument-guiding path is set in the three-dimensional image before simulating neurosurgery and after reconstructing a three-dimensional image of the brain and setting region of interest in the three-dimensional image, and how the simulation proceeds along the instrument-guiding path in the medical operation simulator shown in FIG. 1.

Particularly in simulation of neurosurgery, an instrument-guiding path is set after a three-dimensional image is reconstructed and regions of interest are set. Then, the operation is simulated along the instrument-guiding path.

FIG. 8 shows a three-dimensional image of the brain. Assume that an affected part identified as a region 20 exits and two critical regions 21 and 22 in the three-dimensional image. In this case, an instrument-guiding path 23 is set in the three-dimensional image before simulating neurosurgery on the region 20.

There are various types of operations, which are to be simulated. In one operation, a doctor performs incision, exposing an affected part present in the patient's body. In another operation, the doctor cuts no tissues, and inserts an endoscope into the body along with a medical instrument and manipulates the instrument, while observing the affected part through the endoscope. The region in which the instrument is moved differs in accordance with the type of the operation.

In the first-mentioned operation, the instrument is moved in a large region. In the operation using the endoscope, the instrument is moved in a small region.

In a simulated operation, the size of a region in which an instrument can be moved is determined in accordance with the type of the operation. In the medical operation simulator of this invention, too, the size of the region in which the operation input device 1 can be moved is selected in accordance with the type of the operation simulated. More specifically, the region is set to enable the device 1 to move for 15 cm at most from its neutral or balanced position if the simulated operation is one wherein incision is conducted, exposing an affected part. If the simulated operation is one wherein an endoscope is used, the region is set to enable the device 1 to move for 30 cm at most from its neutral or balanced position. In either case, the operation input device 1 cannot be moved, with any part of it not moving outside the region thus set.

The size of the image displayed in a simulated operation depends on the type of the operation. Namely, the image displayed in the simulation of the operation wherein incision is conducted, exposing the affected part, an image of the affected part is displayed which has the same size as the affected part. And the image displayed in the simulation of the operation using an endoscope is one either enlarged or distorted due to the aberration inherent in the endoscope. A distorted image is formed by processing the image data. Thus, the simulator can present an image which is very similar to one that is really observed though the endoscope.

The size and motion of the image of the instrument, displayed by the display device 8, is changed in accordance with the signals supplied from the operation input device 1. This is achieved by processing the image data in the same way as the data representing the image of the affected part is processed as described above.

Figures 9, 10:
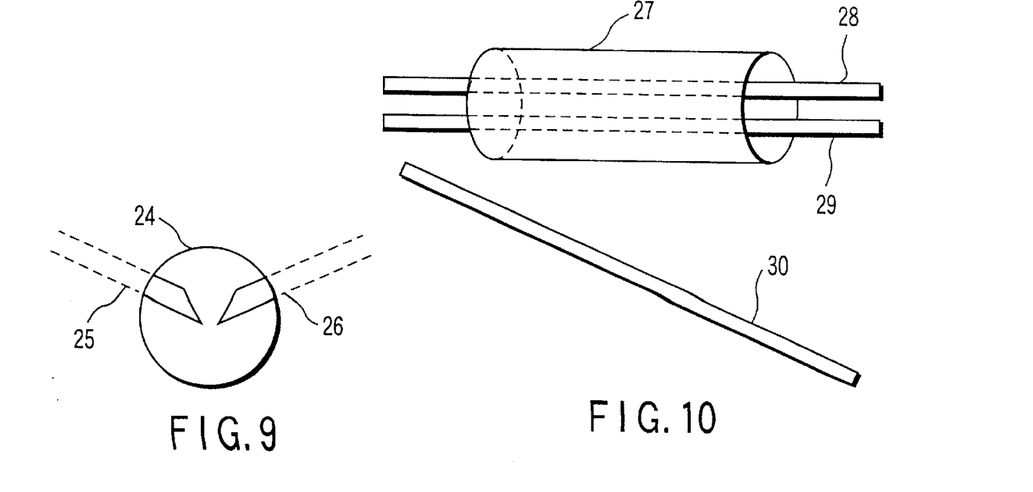
FIG. 9 is a diagram for explaining how the magnification and motion of the images of instruments, displayed on the display 80, are controlled by signals supplied from the operation input device 1, as in the process of deforming the images, in the medical operation simulator shown in FIG. 1.
FIG. 10 is a diagram for explaining how medical instruments 28 and 28 are manipulated within the sheath 27 of an endoscope, when an operation using an endoscope is simulated by using the medical operation simulator shown in FIG. 1.

In an operation using an endoscope, the view field is circular as is represented by a region 24 shown in FIG. 9. This is because the view field is defined by the cross section of the inner sheath of the endoscope. The tips of imitation instruments 25 and 26 are displayed in this circular view field as is illustrated in FIG. 9. The other part of either instrument, which is outside the view field, is represented by dotted lines.

In an operation using an endoscope, a guide sheath is used to guide a medical instrument into the patient's body. When the instrument happens to contact the endoscope or the guide sheath, it may not be further moved or may receive a reaction. This situation should be and is simulated in the medical operation simulator of this invention. In the simulation, the distance between the image of the imitation instrument and the image of the endoscope or guide sheath is always monitored. When the instrument contacts the guide sheath, the operation input device 1 is disabled from moving further outwards, or a large reaction is applied to the operation input device 1.

Assume that two instruments 28 and 29 are manipulated in a guide sheath 27 as illustrated in FIG. 10. The distance between the inner surface of the sheath 27 and the instrument 28 and the distance between the inner surface of the instrument 29 are monitored continuously. When it is detected that the instrument 28, for example, contacts the inner surface of the sheath 27, a feedback signal representing a large reaction is supplied to the operation input device 1, preventing the device 1 from moving further outwards.

Assume that, as shown in FIG. 10, an instrument 30 is inserted into the patient's body in a different direction from the direction in which the sheath 27 is inserted. When it is detected that the instrument 30 contacts the sheath 27, a reaction is applied to the operation input device 1 in the same way as described above.

Figure 11:
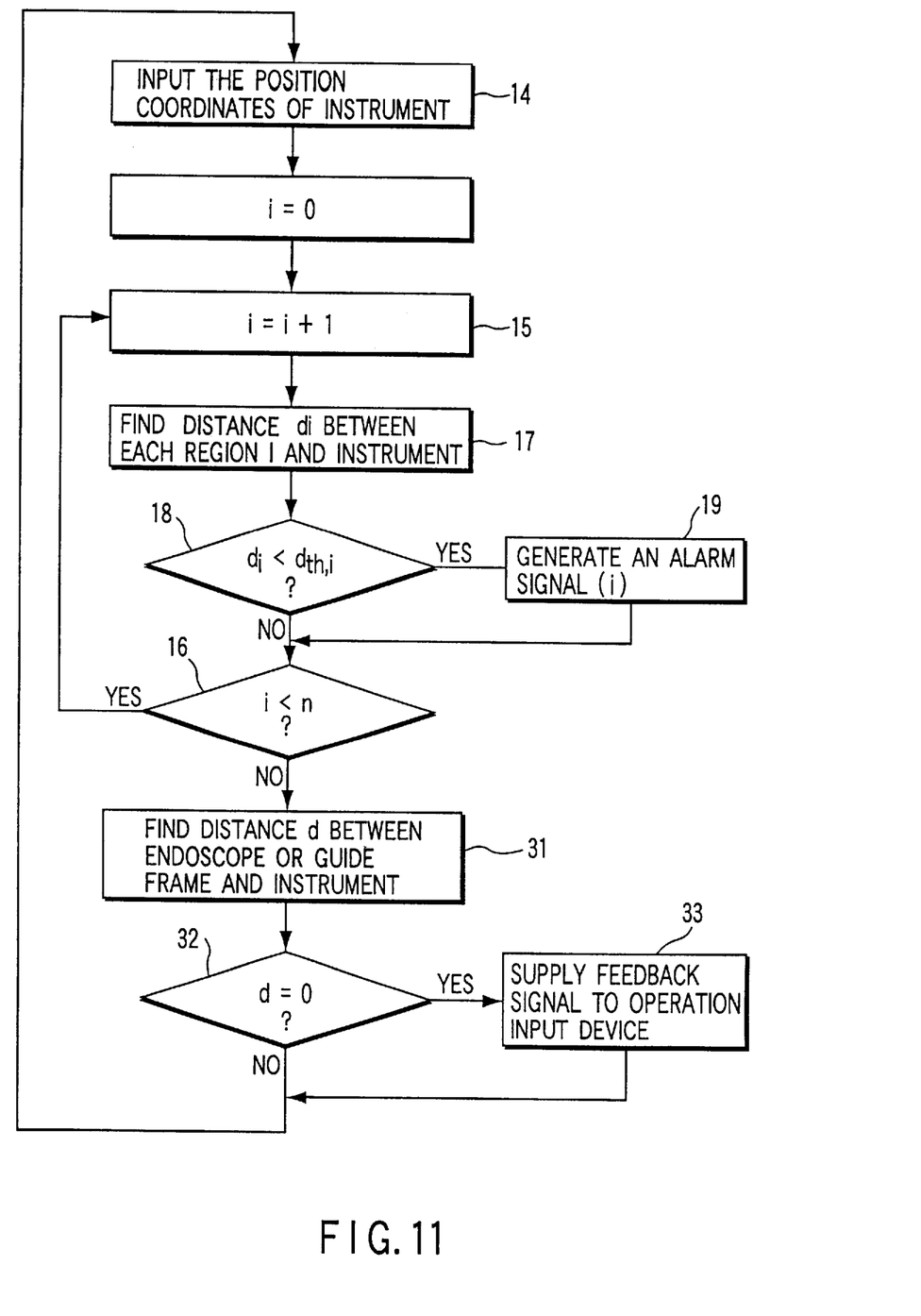
FIG. 11 is a flow chart explaining how a feedback signal is generated to apply a large reaction to the operation input device 1 when it is detected that an instrument contacts a region of interest, while an operation using an endoscope is being simulated by using the medical operation simulator shown in FIG. 1.

How the operation input device 1 is prevented from moving further will be explained, with reference to the flow chart of FIG. 11. In Step 31, the distance d between the image of the instrument and the guide sheath or endoscope is calculated. In Step 32, it is determined whether the distance d is zero (0). If YES in Step 32, the operation goes to Step 33. In Step 33, a feedback signal is generated and supplied to the operation input device 1. The other steps shown in FIG. 11 are identical to those of generating an alarm signal, shown in FIG. 4, and are not described here.

The present invention as set forth in the foregoing description provides the following medical operation simulators and the following methods of controlling the simulators, which operate and achieve specific advantages as will be described below.

(1) A medical operation simulator according to a first aspect of the invention, comprising:

a three-dimensional image reconstructing device for processing data representing slice images, thereby to generate three-dimensional image data, and supplying the three-dimensional image data to a display device;

an instrument-image forming device for forming an image of a medical instrument, said image moving in the same way that a medical instrument provided on an operation input device is manipulated by an operator, and for supplying data representing the image of the medical instrument to the display device, thereby to display the image of the medical instrument together with a three-dimensional image represented by the three-dimensional image data generated by the three-dimensional image reconstructing device; and an approach data presenting device for converting data showing an approach of the medical instrument toward a region of interest into at least one of an aural sensation, visual sensation, pressure sensation and touch sensation by performing approach data presentation processing, and for presenting at least one of the aural sensation, visual sensation, pressure sensation and touch sensation.

The simulator according to the first aspect of the invention can perform an accurate simulation, because the operator can know how much the image of the instrument has approached, or how far it is positioned from, an affected part or a critical region, while observing the three-dimensional image displayed.

(2) A medical operation simulator of the type described in above paragraph (1), according to a second aspect of the invention, in which the approach data presenting device causes the operation input device to exert a reaction or stops the operation input device to inhibit the medical instrument from entering an anti-invasion region, when the medical instrument approaches the region of interest or the anti-invasion region in a virtual space defined by the three-dimensional image.

The simulator according to the second aspect of the invention can perform a realistic simulation. This is because the operation input device exerts a reaction, or a sensation of force, to the operator when the medical instrument approaches the region of interest or the anti-invasion region (3) A medical operation simulator of the type described in above paragraph (1), according to a third aspect of the invention, in which the approach data presenting device outputs an alarm signal when the medical instrument approaches a region of interest, said alarm signal having a magnitude that is changed in accordance with a distance between the medical instrument and the region of interest or a distance from the region of interest, defined by the operator.

The simulator according to the third aspect of the invention can perform a more accurate simulation. This is because a sensation changing stepwise in intensity as the instrument approaches the affected part or a critical region is given to the operator's hand. Thus, the operator can recognize how much the instrument has approached or moved away from the affected part or critical region, or which region the instrument is approaching or from which part it is moving away.

(4) A medical operation simulator of the type described in above paragraph (1), according to a fourth aspect of the invention, in which the three-dimensional image reconstructing device distinguishes an affected region from anti-invasion regions such as blood vessels, nerves and the like, and sets an instrument-guiding path for guiding the medical instrument from the skin of the head to an affected part in the brain, and wherein the approach data presenting device continuously presents the approach data while the simulation proceeds along the instrument-guiding path.

The simulator according to the fourth aspect of the invention can perform a more realistic simulation, because the simulation proceeds along a preset instrument-guiding path which reaches the affected part.

(5) A medical operation simulator of the type described in above paragraph (1), according to a fifth aspect of the invention, which further comprises a selection device for selecting an operation using an endoscope or an operation including an incision procedure, and in which the approach data presenting device alters a region within which the medical instrument is able to move and a mode of displaying the image of the medical instrument on the display device in accordance with which operation has been selected by the selection device.

The simulator according to the fifth aspect of the invention can simulate various types of operations, since it is possible to change the size of the region within which the medical instrument can be moved, in accordance with the type of the operation to simulate. That is, the instrument can be moved within a small region to simulate an operation using an endoscope, and within a large region to simulate an operation including an incision procedure.

(6) A medical operation simulator of the type described in above paragraph (1), according to a sixth aspect of the invention, in which the approach data presenting device determines whether the image of the medical instrument contacts a sheath of an endoscope while an operating using the endoscope is being simulated, and prevents the operation input device from further moving or applies a large reaction to the operation input device when it is determined that the image of the medical instrument contacts the sheath of the endoscope.

The simulator according to the sixth aspect of the invention can simulate an operation using an endoscope realistically. This is because the operation input device stops and would not move once the image of the instrument has contacted the inner surface of the sheath of the endoscope during the simulated operation using the endoscope.

(7) A method of controlling a medical operation simulator, according to a seventh aspect of the invention, comprising:
   processing data representing slice images, thereby to generate three-dimensional image data, and then supplying the three-dimensional image data to a display device;
   forming an image of a medical instrument, said image moving in the same way that a medical instrument provided on an operation input device is manipulated by an operator, and then supplying data representing the image of the medical instrument to the display device, thereby to display the image of the medical instrument together with a three-dimensional image represented by the three-dimensional image data generated; and
   converting data showing an approach of the medical instrument toward a region of interest into at least one of an aural sensation, visual sensation, pressure sensation and touch sensation by performing approach data presentation processing, and presenting at least one of the aural sensation, visual sensation, pressure sensation and touch sensation.

The method according to the seventh aspect of the invention can make the simulator perform an accurate simulation, because the operator can know how much the image of the instrument has approached, or how far it is positioned from, an affected part or a critical region, while observing the three-dimensional image displayed.

(8) A method of the type described in above paragraph (7), according to an eighth aspect of the invention, in which the operation input device exerts a reaction or is stopped to inhibit the medical instrument from entering an anti-invasion region, when the medical instrument approaches the region of interest or the anti-invasion region in a virtual space defined by the three-dimensional image.

The method according to the eighth aspect of the invention can make the simulator perform a realistic simulation. This is because the operation input device exerts a reaction, or a sensation of force, to the operator when the medical instrument approaches the region of interest or the anti-invasion region (9) A method of the type described in above paragraph (7), according to a ninth aspect of the invention, in which the approach of the medical instrument toward a region of interest is presented by outputting an alarm signal when the medical instrument approaches a region of interest, said alarm signal having a magnitude that is changed in accordance with a distance between the medical instrument and the region of interest or a distance from the region of interest, defined by the operator.

The method according to the ninth aspect of the invention enables the simulator to perform a more accurate simulation. This is because a sensation changing stepwise in intensity as the instrument approaches the affected part or a critical region is given to the operator's hand. Thus, the operator can recognize how much the instrument has approached or moved away from the affected part or critical region, or which region the instrument is approaching or from which region it is moving away.

(10) A method of the type described in above paragraph (7), according to a tenth aspect of the invention, in which the step of supplying the three-dimensional image data to a display device includes a step of distinguishing an affected region from anti-invasion regions such as blood vessels, nerves and the like, and then setting an instrument-guiding path for guiding the medical instrument from the skin of the head to an affected part in the brain, and wherein the step of presenting the approach data includes a step of continuously presenting the approach data while the simulation proceeds along the instrument-guiding path.

The method according to the tenth aspect of the invention enables the simulator to perform a more realistic simulation, because the simulation proceeds along a preset instrument-guiding path which reaches the affected part.

(11) A method of the type described in above paragraph (7), according to an eleventh aspect of the invention, which further comprises a step of selecting an operation using an endoscope or an operation including an incision procedure, and in which the step of presenting the approach data is able to alter a region within which the medical instrument is able to move and a mode of displaying the image of the medical instrument on the display device in accordance with which operation has been selected.

The method according to the eleventh aspect of the invention enables the simulator to simulate various types of operations. This is because it is possible to change the size of the region within which the medical instrument, in accordance with the type of the operation to simulate. That is, the instrument can be moved within a small region to simulate an operation using an endoscope, and within a large region to simulate an operation including an incision procedure.

(12) A method of the type described in above paragraph (7), according to a twelfth aspect of the invention, in which in the step of presenting the approach data it is determined whether the image of the medical instrument contacts a sheath of an endoscope while an operating using the endoscope is being simulated, and the operation input device is prevented from further moving or applies a large reaction to the operation input device when it is determined that the image of the medical instrument contacts the sheath of the endoscope.

The method according to the twelfth aspect of the invention enables the simulator to simulate an operation using an endoscope realistically. This is because the instrument cannot be moved further once the image of the instrument has contacted the inner surface of the sheath of the endoscope during the simulated operation using the endoscope.

As has been described in detail, the present invention can provide a medical operation simulation system which includes a medical operation simulator and a method of controlling the apparatus. The simulator reconstructs three-dimensional images from slice images, displays the three-dimensional images, enables an operator to operate a operation input device to move virtual instruments on a display and presents data showing how much any instrument has approached a region of interest, thereby accomplishing high-reality simulation. Including the simulator and the method of controlling the simulator, the medical operation simulation system can present the approach data to the operator.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A medical operation simulator comprising:
   a three-dimensional image reconstructing device that: (i) processes data representing slice images, thereby to generate three-dimensional image data, and (ii) supplies the three-dimensional image data to a display device;
   an instrument-image forming device that: (i) forms an image of a medical instrument, said image moving in the same way that a medical instrument provided on an operation input device is manipulated by an operator, and (ii) supplies data representing the image of the medical instrument to the display device, thereby to display the image of the medical instrument together with a three-dimensional image represented by the three-dimensional image data generated by the three-dimensional image reconstructing device; and
   an approach data presenting device that: (i) converts data showing an approach of the medical instrument toward a region of interest into at least one of an aural sensation, visual sensation, pressure sensation and touch sensation by performing approach data presentation processing, and (ii) presents at least one of the aural sensation, visual sensation, pressure sensation and touch sensation;
   wherein the approach data presenting device outputs an alarm signal when the medical instrument approaches a region of interest, said alarm signal having a magnitude that is changed in accordance with one of: (i) a distance between the medical instrument and the region of interest, and (ii) a distance from the region of interest.

2. A simulator according to claim 1, wherein the approach data presenting device causes the operation input device to one of exert a reaction and stop the operation input device so as to inhibit the medical instrument from entering an anti-invasion region, when the medical instrument approaches one of the region of interest and the anti-invasion region in a virtual space defined by the three-dimensional image.

3. A simulator according to claim 1, which further comprises a selection device that selects one of an operation using an endoscope and an operation including an incision procedure, and wherein the approach data presenting device alters a region within which the medical instrument is able to move and a mode of displaying the image of the medical instrument on the display device in accordance with the operation selected by the selection device.

4. A simulator according to claim 1, wherein the approach data presenting device (i) determines whether the image of the medical instrument contacts a sheath of an endoscope while an operation using the endoscope is being simulated, and (ii) at least one of prevents the operation input device from further moving and applies a large reaction to the operation input device when it is determined that the image of the medical instrument contacts the sheath of the endoscope.

5. A medical operation simulator comprising:
   a three-dimensional image reconstructing device that: (i) processes data representing slice images, thereby to generate three-dimensional image data, and (ii) supplies the three-dimensional image data to a display device;
   an instrument-image forming device that: (i) forms an image of a medical instrument, said image moving in the same way that a medical instrument provided on an operation input device is manipulated by an operator, and (ii) supplies data representing the image of the medical instrument to the display device, thereby to display the image of the medical instrument together with a three-dimensional image represented by the three-dimensional image data generated by the three-dimensional image reconstructing device; and an approach data presenting device that: (i) converts data showing an approach of the medical instrument toward a region of interest into at least one of an aural sensation, visual sensation, pressure sensation and touch sensation by performing approach data presentation processing, and (ii) presents at least one of the aural sensation, visual sensation, pressure sensation and touch sensation;

wherein the three-dimensional image reconstructing device distinguishes an affected region from anti-invasion regions, which include blood vessels and nerves, and sets an instrument-guiding path for guiding the medical instrument from an external area on a head to an affected part in a brain, and wherein the approach data presenting device continuously presents the approach data while the simulation proceeds along the instrument-guiding path.

6. A simulator according to claim 5, wherein the approach data presenting device causes the operation input device to one of exert a reaction and stop the operation input device so as to inhibit the medical instrument from entering an anti-invasion region, when the medical instrument approaches one of the region of interest and the anti-invasion region in a virtual space defined by the three-dimensional image.

7. A simulator according to claim 5, which further comprises a selection device that selects one of an operation using an endoscope and an operation including an incision procedure, and wherein the approach data presenting device alters a region within which the medical instrument is able to move and a mode of displaying the image of the medical instrument on the display device in accordance with the operation selected by the selection device.

8. A simulator according to claim 5, wherein the approach data presenting device (i) determines whether the image of the medical instrument contacts a sheath of an endoscope while an operation using the endoscope is being simulated, and (ii) at least one of prevents the operation input device from further moving and applies a large reaction to the operation input device when it is determined that the image of the medical instrument contacts the sheath of the endoscope.

9. A method of controlling a medical operation simulator comprising:

processing data representing slice images, thereby to generate three-dimensional image data, and then supplying the three-dimensional image data to a display device;

forming an image of a medical instrument, said image moving in the same way that a medical instrument provided on an operation input device is manipulated by an operator, and then supplying data representing the image of the medical instrument to the display device, thereby to display the image of the medical instrument together with a three-dimensional image represented by the three-dimensional image data generated; and converting data showing an approach of the medical instrument toward a region of interest into at least one of an aural sensation, visual sensation, pressure sensation and touch sensation by performing approach data presentation processing, and presenting at least one of the aural sensation, visual sensation, pressure sensation and touch sensation;

wherein the approach of the medical instrument toward a region of interest is presented by outputting an alarm signal when the medical instrument approaches a region of interest, said alarm signal having a magnitude that is changed in accordance with one of: (i) a distance between the medical instrument and the region of interest, and (ii) a distance from the region of interest.

10. A method according to claim 9, wherein the operation input device one of exerts a reaction and is stopped so as to inhibit the medical instrument from entering an anti-invasion region, when the medical instrument approaches one of the region of interest and the anti-invasion region in a virtual space defined by the three-dimensional image.

11. A method according to claim 9, which further comprises a step of selecting one of an operation using an endoscope and an operation including an incision procedure, and wherein the step of presenting the approach data comprises altering a region within which the medical instrument is able to move and a mode of displaying the image of the medical instrument on the display device in accordance with which operation has been selected.

12. A method according to claim 9, wherein in the step of presenting the approach data it is determined whether the image of the medical instrument contacts a sheath of an endoscope while an operation using the endoscope is being simulated, and wherein the operation input device at least one of is prevented from further moving and applies a large reaction to the operation input device when it is determined that the image of the medical instrument contacts the sheath of the endoscope.

13. A method of controlling a medical operation simulator comprising:

processing data representing slice images, thereby to generate three-dimensional image data, and then supplying the three-dimensional image data to a display device;

forming an image of a medical instrument, said image moving in the same way that a medical instrument provided on an operation input device is manipulated by an operator, and then supplying data representing the image of the medical instrument to the display device, thereby to display the image of the medical instrument together with a three-dimensional image represented by the three-dimensional image data generated; and converting data showing an approach of the medical instrument toward a region of interest into at least one of an aural sensation, visual sensation, pressure sensation and touch sensation by performing approach data presentation processing, and presenting at least one of the aural sensation, visual sensation, pressure sensation and touch sensation;

wherein the step of supplying the three-dimensional image data to a display device comprises distinguishing an affected region from anti-invasion regions, which include blood vessels and nerves, and then setting an instrument-guiding path for guiding the medical instrument from an external area on a head to an affected part in a brain, and wherein the step of presenting the approach data comprises continuously presenting the approach data while the simulation proceeds along the instrument-guiding path.

14. A method according to claim 13, wherein the operation input device one of exerts a reaction and is stopped so as to inhibit the medical instrument from entering an anti-invasion region, when the medical instrument approaches one of the region of interest and the anti-invasion region in a virtual space defined by the three-dimensional image.

15. A method according to claim 13, which further comprises a step of selecting one of an operation using an endoscope and an operation including an incision procedure, and wherein the step of presenting the approach data comprises altering a region within which the medical instrument is able to move and a mode of displaying the image of the medical instrument on the display device in accordance with which operation has been selected.

16. A method according to claim 13, wherein in the step of presenting the approach data it is determined whether the image of the medical instrument contacts a sheath of an endoscope while an operation using the endoscope is being simulated, and wherein the operation input device at least one of is prevented from further moving and applies a large reaction to the operation input device when it is determined that the image of the medical instrument contacts the sheath of the endoscope.

* * * * *